(12) United States Patent
Ebanks

(10) Patent No.: US 9,747,584 B2
(45) Date of Patent: Aug. 29, 2017

(54) METHOD AND SYSTEM FOR GENERATING VISUALLY ENHANCED CALENDAR FROM PRE-EXISTING CALENDAR ON ELECTRONIC DEVICE

(71) Applicant: Gordon Anthony Ebanks, New York, NY (US)

(72) Inventor: Gordon Anthony Ebanks, New York, NY (US)

(*) Notice: Subject to any disclaimer, the term of this patent is extended or adjusted under 35 U.S.C. 154(b) by 364 days.

(21) Appl. No.: 14/158,139

(22) Filed: Jan. 17, 2014

(65) Prior Publication Data
US 2014/0207805 A1    Jul. 24, 2014

Related U.S. Application Data

(60) Provisional application No. 61/754,224, filed on Jan. 18, 2013.

(51) Int. Cl.
*G06F 17/30* (2006.01)
*G06Q 10/10* (2012.01)

(52) U.S. Cl.
CPC ..... *G06Q 10/109* (2013.01); *G06F 17/30268* (2013.01)

(58) Field of Classification Search
CPC .............................. G06F 17/30268
USPC ........................................ 707/755
See application file for complete search history.

(56) References Cited

U.S. PATENT DOCUMENTS

| | | | |
|---|---|---|---|
| 6,202,062 B1* | 3/2001 | Cameron | G06F 17/30876 |
| 8,612,876 B2* | 12/2013 | Barnett | G06Q 10/06314 |
| | | | 715/767 |
| 2001/0038375 A1* | 11/2001 | Breiner | G06F 3/0483 |
| | | | 345/156 |
| 2004/0268270 A1* | 12/2004 | Hill | G09G 5/14 |
| | | | 715/733 |
| 2005/0177404 A1* | 8/2005 | Hyttinen | G06Q 10/00 |
| | | | 719/321 |
| 2007/0124371 A1 | 5/2007 | Desai et al. | |
| 2007/0260989 A1* | 11/2007 | Vakil | G06Q 10/109 |
| | | | 715/748 |
| 2008/0034047 A1* | 2/2008 | Rosenberg | G06Q 10/109 |
| | | | 709/206 |
| 2009/0210391 A1* | 8/2009 | Hall | G06F 17/30867 |
| 2009/0292690 A1* | 11/2009 | Culbert | G06Q 10/107 |

(Continued)

OTHER PUBLICATIONS

The International Bureau of WIPO, International Preliminary Report on Patentability for corresponding International Application No. PCT/US2014/012167 mailed Jul. 30, 2015.

(Continued)

*Primary Examiner* — Noosha Arjomandi
(74) *Attorney, Agent, or Firm* — Brooks Kushman P.C.

(57) ABSTRACT

A method for enhancing a pre-existing calendar on an electronic device includes parsing an event of the pre-existing calendar for an item of information associated with the event. The method further includes searching at least one source for a visual representation indicative of the information associated with the event using the item of information as a search term. The method further includes forming a visual enhancement layer including the visual representation and generating a visually enhanced calendar based on the visual enhancement layer and the pre-existing calendar for display on the electronic device in lieu of the pre-existing calendar.

14 Claims, 1 Drawing Sheet

(56) References Cited

U.S. PATENT DOCUMENTS

| | | | | |
|---|---|---|---|---|
| 2010/0180001 A1* | 7/2010 | Hardt | ................... | G06F 11/32 709/207 |
| 2011/0106892 A1* | 5/2011 | Nelson | ................ | G06Q 10/109 709/206 |
| 2011/0128825 A1* | 6/2011 | Tanaka | ................... | G06F 3/147 368/29 |
| 2011/0184995 A1* | 7/2011 | Cardno | ............ | G06F 17/30554 707/805 |
| 2011/0252351 A1* | 10/2011 | Sikora | ................ | G06Q 10/109 715/769 |
| 2011/0261049 A1* | 10/2011 | Cardno | ................ | G06Q 10/10 345/419 |
| 2012/0053986 A1* | 3/2012 | Cardno | ............. | G06Q 30/0201 705/7.29 |
| 2014/0171091 A1* | 6/2014 | Cai | ................... | H04W 48/20 455/450 |
| 2014/0297666 A1* | 10/2014 | Morris | ................ | G06Q 10/109 707/754 |

OTHER PUBLICATIONS

Twitcal. TwitCal Demo Movie. 2010. [retrieved on Mar. 31, 2014]. Retrieved from the Internet: <URL.https://www.youtube.com/watch?v=4oA_92q3RHw . entire document.

United States Patent and Trademark Office, The International Search Report and the Written Opinion of the International Searching Authority for corresponding International Application No. PCT/US2014/012167 mailed Apr. 28, 2014.

\* cited by examiner

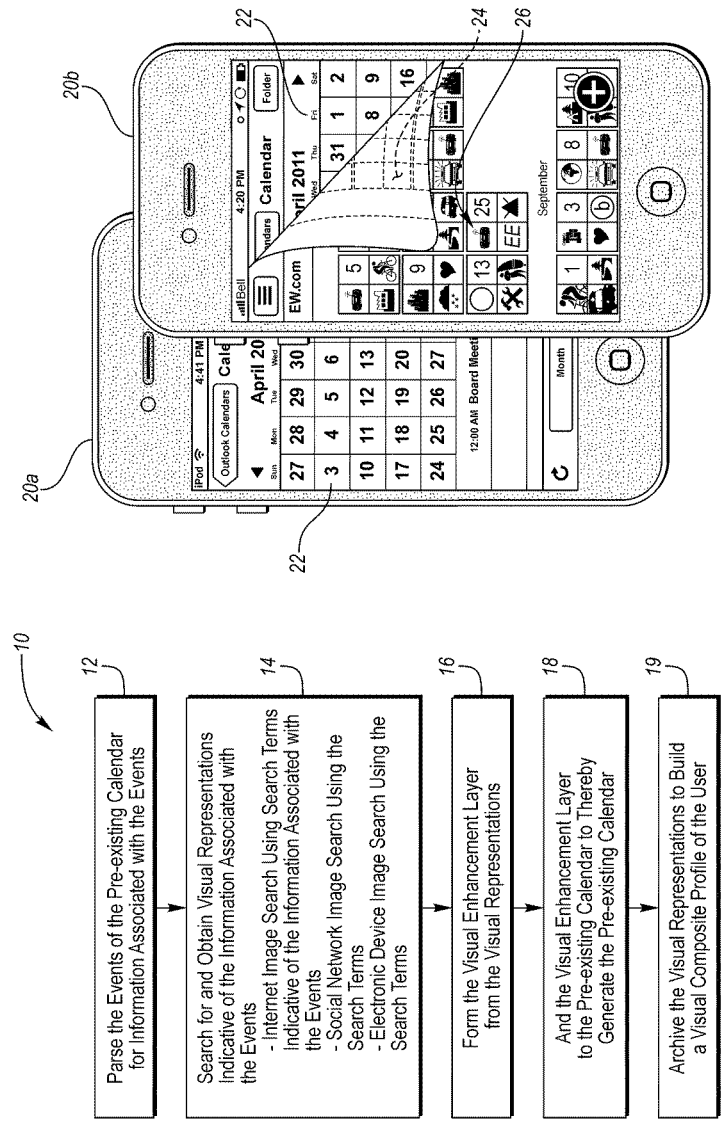

METHOD AND SYSTEM FOR GENERATING VISUALLY ENHANCED CALENDAR FROM PRE-EXISTING CALENDAR ON ELECTRONIC DEVICE

CROSS-REFERENCE TO RELATED APPLICATIONS

This application claims the benefit of U.S. Provisional Application No. 61/754,224, filed Jan. 18, 2013; the disclosure of which is hereby incorporated by reference in its entirety.

TECHNICAL FIELD

The present invention relates to calendar application software (e.g., a calendar "app") for computing and/or communication consumer devices (i.e., "electronic devices").

BACKGROUND

Present electronic devices including mobile electronic devices such as phones, tablet computers, and wearable computing devices operated by iOS™ and Android™ operating software platforms include calendar application software. The calendar application software enables a calendar on the device for use by a user. Like typical calendars, calendars enabled on the devices are utilitarian and highly functional, but are not social-media friendly.

SUMMARY

An object of the present invention includes converting a pre-existing (i.e., typical, ordinary) calendar of an electronic device into a visually enhanced calendar on the electronic device.

In carrying out at least one of the above and other objects, an embodiment of the present invention provides a method for enhancing a pre-existing calendar on an electronic device. The method includes parsing an event of the pre-existing calendar for an item of information associated with the event. The method further includes searching at least one source for a visual representation indicative of the information associated with the event using the item of information as a search term. The method further includes forming a visual enhancement layer including the visual representation. The method further includes generating a visually enhanced calendar based on the visual enhancement layer and the pre-existing calendar for display on the electronic device in lieu of the pre-existing calendar.

Further, in carrying out at least one of the above and other objects, an embodiment of the present invention provides a system configured to carry out the method.

Also, in carrying out at least one of the above and other objects, an embodiment of the present invention provides an electronic device having a pre-existing calendar and an agent. The agent is configured to parse an event of the pre-existing calendar for an item of information associated with the event, search at least one source for a visual representation indicative of the information associated with the event using the item of information as a search term, form a visual enhancement layer including the visual representation, and generate a visually enhanced calendar based on the visual enhancement layer and the pre-existing calendar for display on the electronic device in lieu of the pre-existing calendar.

Embodiments of the present invention are directed to generating a visually enhanced calendar on an electronic device from the pre-existing calendar of the electronic device. In general, a visual enhancement layer based on the pre-existing calendar is generated and then overlaid onto the pre-existing calendar to thereby generate the visually enhanced calendar. As such, the visually enhanced calendar (i.e., the overall calendar) includes two layers: (i) the additional visual enhancement layer and (ii) the existing calendar layer. Embodiments of the present invention provide a visual calendar experience platform on an electronic device by adding a visual enhancement layer to the pre-existing calendar of the device. User and entertainment brands may activate the visual enhancement layer. The visual enhancement layer is built from the user's pre-existing calendar as explained herein.

A method and/or a system in accordance with embodiments of the present invention generate a visually enhanced calendar based on the pre-existing calendar of an electronic device when the electronic device (or the pre-existing calendar itself) is connected or synched to a server or the like configured to conduct at least part of the operation of the method and/or the system. In operation, a processing stage parses one or more of the events of the pre-existing calendar for information associated with each parsed calendar event. Another processing stage obtains visual representations relevant to the information associated with each parsed event. Another processing stage forms the visual enhancement layer with the visual representations and then overlays the visual enhancement layer onto the pre-existing calendar to thereby generate the visually enhanced calendar.

Such a method and/or a system may be designated herein as "Cannonball". In one form, the method and/or the system is embodied as calendar application software (i.e., a calendar app) that provides a visual calendar experience platform on electronic devices. Such electronic devices include desktop devices, mobile devices operated by iOS™ operating software including the iPhone™ phone and the iPad® tablet, mobile devices operated by Android™ operating software, wearable devices such as the Google Glass™ wearable computing device and Samsung Galaxy Gear™ watches, etc. In general, the method and system in accordance with embodiments of the present invention provide a visual calendar experience platform for use with electronic devices configured for communication with the Internet and other electronic devices.

BRIEF DESCRIPTION OF THE DRAWINGS

FIG. 1 illustrates a flowchart describing operation of a method and a system for converting a pre-existing calendar of an electronic device into a visually enhanced calendar on the electronic device in accordance with an embodiment of the present invention; and FIG. 2 illustrates a mobile phone with a pre-existing calendar displayed thereon and the mobile phone with a representation of a visual enhancement layer being overlaid onto the pre-existing calendar to generate a visually enhanced calendar for display on the mobile phone.

DESCRIPTION

Referring now to FIG. 1, a flowchart 10 describing operation of a method and a system for converting a pre-existing calendar of an electronic device into a visually enhanced calendar on the electronic device in accordance with an embodiment of the present invention is shown. In general, the visually enhanced calendar includes a visual enhancement layer added to the pre-existing calendar or, as appropriate, set in place of the pre-existing calendar. The visual enhancement layer is generated from the pre-existing calendar.

The operation for generating the visually enhanced calendar on an electronic device from the pre-existing calendar commences when the electronic device (or the pre-existing calendar itself) is connected or synched to a server or the like configured to conduct at least part of the operation. Such a server may reside external to the electronic device and be configured to conduct the visually enhanced calendar operation for multiple diverse electronic devices. Alternatively, the server may be embodied as an agent residing at the electronic device and configured to conduct the visually enhanced calendar operation for that electronic device.

Upon the operation commencing, in an initial processing stage of the operation the events (e.g., at least one of the events) of the pre-existing calendar are parsed for information associated with the events as shown in block 12. The information associated with a calendar event typically includes different items of information. For instance, items of information associated with an event may include a descriptor of the event, the location of where the event is to take place, the participants who are to attend the event, the time period during which the event is to take place, etc. As an example, an event in the pre-existing calendar may be lunch at Panera Bread™ restaurant in the local shopping mall with John and Mary on Tuesday lunchtime. Thus, the items of information of this calendar event may be: (i) "lunch" (i.e., descriptor of the event); (ii) Panera Bread™ restaurant in the local shopping mall (i.e., location of where the event is to take place); (iii) John and Mary (i.e., participants who are to attend the event); and (iv) Tuesday lunchtime (i.e., the time period during which the event is to take place). This type of processing pursuant to block 12 is generally done for each calendar event. As such, this processing stage generally parses each event of the pre-existing calendar for the items of information associated with each event.

In a second processing stage of the operation, visual representations indicative of the information associated with the events is searched for and obtained as shown in block 14. That is, the processing pursuant to block 14 searches for appropriate visual representation(s) for the items of information of the events. In general, the processing pursuant to block 14 searches for a visual representation (e.g., an image, video, animation, or other multi-media asset) (generally labeled herein as "image") for each of at least one or more items of information of each calendar event. Using the exemplary event of lunch at Panera Bread™ restaurant in the local shopping mall with John and Mary on Tuesday lunchtime, the processing stage searches for an image of "lunch", an image of a Panera Bread™ restaurant, and an image of John and/or an image of Mary.

The processing pursuant to block 14 searches for the visual representations (i.e., images, video, animation or other multi-media assets associated with and/or indicative of the items of information) by searching various sources. For instance, the processing pursuant to block 14 searches for the visual representations by searching various sources on the Internet. In this case, for example, the processing pursuant to block 14 searches for relevant images, video, animation, or other multi-media assets by way of searching the Internet via a search provider like Google, Bing, Yahoo!, or the like using search terms indicative of the items of information. This image or multi-media assets searching may be done in a manner to how a typical Google™ search for images is conducted. Namely, a search term indicative of the item of information is entered into the search box of the Google™ website. In turn, images or multi-media assets having metadata or the like related to the search term are presented in order of relevancy. The highest ordered presented image may be selected by the processing of block 14 to be the image or multi-media asset for the item of information.

The processing pursuant to block 14 may also be performed using Application Programming Interfaces (API's) to third-party applications including Foursquare™, Google™, Facebook™, Instagram™, etc.

The processing pursuant to block 14 may also search for images, multi-media assets or social media metadata by way of searching public (and private, if given permission to do so) user accounts of social networking services such as Facebook™, LinkedIn™, Twitter™, Instagram™, etc. For instance, the user's Facebook™ social networking account may be searched to find photographs of John and/or Mary. The processing pursuant to block 14 may also search for the images by way of searching various sources on the electronic device (such as a photo or video stream which may have tagged images of John and/or Mary) on which the visually enhanced calendar is provided, again if given user permission to do so. This searching of social network sites and/or the user's electronic device may also be conducted using search terms associated with and/or indicative of the items of information.

As an example, using the exemplary event of lunch at Panera Bread™ restaurant in the local shopping mall with John and Mary on Tuesday lunchtime as an example, a search for images representative of the items of information of the event may produce the following. For the item of information of lunch using "lunch" as the search term with a Google™ search, the image obtained from the search may be a generic sketch indicative of lunch. For the item of information of Panera Bread™ restaurant using "Panera Bread" as the search term with a Google™ search, the image obtained may be the Panera Bread™ brand logo. For the item of information of shopping mall using "shopping mall" along with the location of where the shopping mall is located as the search terms with a Google™ search, an image indicative of that local shopping mall may likewise be obtained. For instance, the image may be an image of the shopping mall. The information indicative of the location of the shopping mall may be obtained from location-based social networking services such as the user's Foursquare™ social networking service account and the like. For the items of information of John and Mary, an image of John and/or an image of Mary may be obtained for example from one of the user's social networking service accounts, sources on the user's electronic device, general internet searching for images as described above, and the like. For the item of information of "Tuesday lunchtime", an image indicative of the time of day at which lunch is typically eaten may be obtained. For instance, this image may be a drawing of the mid-day sun (as opposed to an image of the sun rising for breakfast or the sun setting for dinner).

In a third processing stage of the operation, the visual enhancement layer is formed from the visual representations as shown in block 16. That is, the visual enhancement layer is made up of the visual representations in alignment with the events of the calendar. For instance, using the exemplary example of lunch at Panera Bread™ restaurant in the local shopping mall with John and Mary on Tuesday lunchtime, the portion of the visual enhancement layer aligning with Tuesday lunchtime is made up of the visual representations (i.e., the generic sketch indicative of lunch, the Panera Bread™ brand logo, the image indicative of that local shopping mall, the image of John and/or the image of Mary, the image of the mid-day sun) associated with this event.

In a fourth processing stage of the operation, the visual enhancement layer is overlaid (i.e., added to or set in place of) onto the pre-existing calendar to thereby generate the visually enhanced calendar as shown in block 18. In an additional processing stage of the operation, the visual enhancement layer may be presented with visual advertisements for the user or users to visually discover related alternate or supplemental activities. The visual advertisements may correspond to the items of information associated with the calendar events. Additionally or alternatively, the visual advertisements may be based on GPS location, participants, user friends, time of day, type of activity, current activity, past activity, future activity past and available demographic information, and the like.

The method and/or the system in accordance with the embodiment of the present invention may be embodied as calendar application software (i.e., a calendar app) that provides a visual calendar on an electronic device for a user by adding a visual enhancement layer to the pre-existing calendar of the electronic device. Each calendar event is parsed for entity, location, participants, time period, etc., and an algorithm searches for the appropriate visual representation(s). These may be images of the actual location, images of the participants, GPS map representations, images of the corporate entity (if appropriate), live images of the location, etc. The user has the ability to change any of the images. The visually enhanced calendar could also include the event calendar from social networks. All of the images may be archived to build a visual composite profile of the user's past and future as indicated in block 19.

Referring now to FIG. 2, a mobile phone 20a with a pre-existing calendar 22 displayed thereon and a mobile phone 20b with a representation of a visual enhancement layer 24 being overlaid onto pre-existing calendar 22 to generate a visually enhanced calendar 26 for display on mobile phone 20b are shown.

The method and/or the system in accordance with the embodiment of the present invention generate a visually enhanced calendar where users can curate their future. Upon initial connection of a pre-existing calendar to a server or the like associated with the method and/or the system, the server adds images to the pre-existing calendar to thereby generate the visually enhanced calendar and imports, for example, Facebook™ birthdays with links to the user's wall. This works throughout the calendar application software platform. A user clicking on a plan (i.e., an event) gets directions, RSVP, invitations, check-ins, related meta-data, social media feeds, etc. The user can change the pictures and add their own images to any plans that the user makes. If the user cannot find an image, the server can search for and choose an appropriate image as described herein. Each event can be public or private and when the server imports the pre-existing calendar, Facebook™ birthdays, etc., the events are designated as private.

The server may be pre-loaded with two content feeds: (i) what music is playing locally; and (ii) the best deals in the user's neighborhood. Other feeds may be added with upcoming events from Facebook™, Foursquare™, Songkick™, Groupon™, and other third-party content feeds, brand content feeds, etc.

The server may also create a visual profile of the user's past activities, which are listed as events in the calendar, and the user's future activities, which are also listed as events in the calendar. In this way, methods and/or systems in accordance with the embodiments of the present invention are relevant to future streams in addition to current and past streams. As such, methods and/or systems in accordance with embodiments of the present invention fill a "future" void in social media as only current and past streams (and not future streams) are addressed.

Methods and/or systems in accordance with embodiments of the present invention may also process events to create a future simulation for an individual, group, or geographic location. This simulation may be comprised of static images, video, multi-media or 3D animation based on future timeline events, locations, attendees, related meta data, related social media data, and related multi-media assets.

As described, a pre-existing calendar lists events therein and includes information descriptive of the calendar events. The operation of a method and a system for converting a pre-existing calendar of an electronic device into a visually enhanced calendar on the electronic device in accordance with an embodiment of the present invention includes parsing the information for each event into one or more items of information. Alternatively, the information may already be parsed into the items of information on the pre-existing calendar. In either event, the operation includes obtaining respective images representative of the items of information, forming the visual enhancement layer with the obtained images, and overlaying the visual enhancement layer on the pre-existing calendar to thereby generate the visually enhanced calendar. Further, all items can attach relevant future metadata including weather, traffic forecasts, related events, related events nearby, friends nearby, etc.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for enhancing a pre-existing calendar on an electronic device, the method comprising:
 parsing events of the pre-existing calendar for names of objects respectively associated with the events;
 searching at least one source for images of the object objects using the names of the object objects as search terms;
 forming a visual enhancement layer including the images of the objects;
 generating a visually enhanced calendar having the visual enhancement layer overlaid onto the pre-existing calendar with the images of the object objects being in alignment with the events; and
 displaying the visually enhanced calendar on the electronic device in lieu of the pre-existing calendar.

2. The method of claim 1 wherein:
 the at least one source includes an Internet search provider.

3. The method of claim 1 wherein:
 the at least one source includes a social network source.

4. The method of claim 1 wherein:
 the at least one source includes the electronic device.

5. The method of claim 1 further comprising:
archiving the images of the objects; and displaying the archived images of the objects after the visually enhanced calendar has elapsed.

6. The method of claim 1 wherein:
the electronic device is one of a mobile phone, a tablet computer, and a computer wearable device.

7. A system for enhancing a pre-existing calendar on an electronic device, the system comprising:
a computer configured to parse an event events of the pre-existing calendar for names of objects respectively associated with the events search at least one source for images of the objects using the name names of the objects as search terms, form a visual enhancement layer including the images of the objects, generate a visually enhanced calendar having the visual enhancement layer overlaid onto the pre-existing calendar with the images of the objects being in alignment with the events, and
displaying the visually enhanced calendar on the electronic device in lieu of the pre-existing calendar.

8. The system of claim 7 wherein:
the at least one source includes at least one of an Internet search provider and a social network source.

9. The system of claim 7 wherein:
the server computer is further configured to archive the images of the objects and display the archived images of the objects after the visually enhanced calendar has elapsed.

10. The system of claim 7 wherein:
the electronic device is one of a mobile phone, a tablet computer, and a computer wearable device.

11. An electronic device comprising:
a pre-existing calendar; and
a computer configured to parse events of the pre-existing calendar for names of objects respectively associated with the events, search at least one source for images of the object objects using the name names of the object objects as search terms, form a visual enhancement layer including the image images of the objects, generate a visually enhanced calendar having the visual enhancement layer overlaid onto the pre-existing calendar with the images of the objects being in alignment with the events, and
display the visually enhanced calendar on the electronic device in lieu of the pre-existing calendar.

12. The device of claim 11 wherein:
the computer is further configured to archive the images of the objects and display the archived images of the objects after the visually enhanced calendar has elapsed.

13. The device of claim 11 wherein:
the electronic device is one of a mobile phone, a tablet computer, and a computer wearable device.

14. The device of claim 11 wherein:
the at least one source is an Internet search provider.

* * * * *

UNITED STATES PATENT AND TRADEMARK OFFICE
CERTIFICATE OF CORRECTION

PATENT NO. : 9,747,584 B2  
APPLICATION NO. : 14/158139  
DATED : August 29, 2017  
INVENTOR(S) : Ebanks Page 1 of 1

It is certified that error appears in the above-identified patent and that said Letters Patent is hereby corrected as shown below:

In the Claims

Column 6, Line 50, Claim 1:  
After "images of the"  
Delete "object".

Column 6, Line 51, Claim 1:  
After "using the names of the"  
Delete "object".

Column 6, Line 57, Claim 1:  
After "with the images of the"  
Delete "object".

Column 8, Lines 8-9, Claim 11:  
After "source for images of the"  
Delete "object".

Column 8, Line 9, Claim 11:  
After "objects using the"  
Delete "name".

Column 8, Line 9, Claim 11:  
After "names of the"  
Delete "object".

Column 8, Lines 10-11, Claim 11:  
After "visual enhancement layer including the"  
Delete "image".

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*